(12) United States Patent
DeLugan

(10) Patent No.: US 10,107,554 B2
(45) Date of Patent: Oct. 23, 2018

(54) COLD CORNER FLOW BAFFLE

(71) Applicant: Hamilton Sundstrand Corporation, Windsor Locks, CT (US)

(72) Inventor: Anthony DeLugan, Agawam, MA (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 1091 days.

(21) Appl. No.: 14/299,703

(22) Filed: Jun. 9, 2014

(65) Prior Publication Data

US 2015/0041108 A1    Feb. 12, 2015

Related U.S. Application Data

(60) Provisional application No. 61/864,255, filed on Aug. 9, 2013.

(51) Int. Cl.
| | |
|---|---|
| *F28D 1/06* | (2006.01) |
| *B64D 13/06* | (2006.01) |
| *F28F 9/02* | (2006.01) |
| *F28D 9/00* | (2006.01) |

(52) U.S. Cl.
CPC ............ *F28D 1/06* (2013.01); *B64D 13/06* (2013.01); *F28D 9/0068* (2013.01); *F28F 9/0214* (2013.01); *F28F 2265/00* (2013.01)

(58) Field of Classification Search
CPC ......... F28D 1/06; F28D 9/0068; B64D 13/06; F28F 9/0214; F28F 2265/00; F28F 9/0202; F28F 2009/0287
USPC .................. 165/164, 126, 174, 103; 164/126
See application file for complete search history.

(56) References Cited

U.S. PATENT DOCUMENTS

| | | | | |
|---|---|---|---|---|
| 3,994,335 A | * | 11/1976 | Perkins ................. | F24F 3/0522 137/601.05 |
| 4,312,381 A | * | 1/1982 | Ratner ................. | F16K 11/0525 137/595 |
| 5,101,883 A | * | 4/1992 | Kinmartin .......... | B60H 1/00528 165/137 |
| 5,816,315 A | | 10/1998 | Stark | |

(Continued)

FOREIGN PATENT DOCUMENTS

| | | |
|---|---|---|
| DE | 2753496 A1 | 6/1979 |
| DE | 19636018 A1 | 3/1998 |

(Continued)

OTHER PUBLICATIONS

European Patent Office, Extend European Search Report, dated Jan. 7, 2015, 7 pages.

*Primary Examiner* — Raheena R Malik
(74) *Attorney, Agent, or Firm* — Kinney & Lange, P.A.

(57) ABSTRACT

A heat exchange system includes a cold fluid circuit and a hot fluid circuit. The cold fluid circuit routes a cold fluid to a ram air inlet. From the ram air inlet, the cold fluid is routed to a cold fluid inlet of a heat exchanger. The cold fluid is then routed to a cold fluid outlet of the heat exchanger. The hot fluid circuit is configured to route a hot fluid. The hot fluid is routed through a bleed air valve. From the bleed air valve, the hot fluid is routed to a hot fluid inlet of the heat exchanger. The hot fluid is then routed to a hot fluid outlet of the heat exchanger. The hot fluid is then routed to a header having a first cavity and a second cavity defined within a housing and separated by a baffle.

20 Claims, 4 Drawing Sheets

(56) References Cited

U.S. PATENT DOCUMENTS

| | | | | |
|---|---|---|---|---|
| 6,021,042 A | * | 2/2000 | Anderson | G06F 1/20 |
| | | | | 165/127 |
| 6,155,340 A | | 12/2000 | Folkedal et al. | |
| 6,161,614 A | * | 12/2000 | Woodhull, Jr. | F28D 1/05333 |
| | | | | 165/144 |
| 6,851,468 B2 | * | 2/2005 | Kaspar | F25B 39/04 |
| | | | | 165/132 |
| 7,392,837 B2 | * | 7/2008 | Makino | F28D 1/0435 |
| | | | | 165/140 |
| 7,775,264 B2 | | 8/2010 | Andersson et al. | |
| 9,302,778 B2 | * | 4/2016 | Ji | B64D 37/32 |
| 2004/0141836 A1 | * | 7/2004 | McAuliffe | B64D 13/06 |
| | | | | 415/145 |
| 2004/0251014 A1 | * | 12/2004 | Petersen | F28F 9/0214 |
| | | | | 165/173 |
| 2007/0220900 A1 | * | 9/2007 | Shockling | F02C 3/22 |
| | | | | 60/802 |
| 2008/0128048 A1 | * | 6/2008 | Johnson | B64D 37/32 |
| | | | | 141/59 |
| 2010/0186397 A1 | * | 7/2010 | Emrich | F02M 26/32 |
| | | | | 60/320 |
| 2012/0255715 A1 | | 10/2012 | Army et al. | |
| 2012/0292002 A1 | * | 11/2012 | Saumweber | F02B 29/0462 |
| | | | | 165/164 |
| 2014/0326135 A1 | * | 11/2014 | Massey | B64D 37/32 |
| | | | | 95/39 |

FOREIGN PATENT DOCUMENTS

| | | | | |
|---|---|---|---|---|
| EP | 0212878 A1 | | 3/1987 | |
| EP | 0802380 A1 | * | 10/1997 | F25B 39/04 |
| WO | WO2008107656 A1 | | 9/2008 | |
| WO | 2010107881 A1 | | 9/2010 | |

* cited by examiner

COLD CORNER FLOW BAFFLE

CROSS-REFERENCE TO RELATED APPLICATION(S)

This application claims priority from U.S. Provisional Application Ser. No. 61/864,255, filed Aug. 9, 2013, which is incorporated by reference.

STATEMENT OF GOVERNMENT INTEREST

This invention was made with government support under Contract No. N00019-06-C-0081 awarded by the United States Navy. The government has certain rights in the invention.

BACKGROUND

Inerting systems are used on board aircraft to reduce the volatility of fuel tanks. One type of inerting system, the On-Board Gas Generation System (OBIGGS), is used in aircraft to provide a gas with higher nitrogen levels and lower oxygen levels than ambient air to the head space of fuel tanks. OBIGGS and other inerting systems often require air input within a specific temperature range.

Heat exchangers may be used to transfer heat between fluids. Various types of heat exchangers are known, including cross-flow, counter-flow, plate-and-pin, plate-shell, and others. In a cross-flow heat exchanger, the fluids travel roughly perpendicular to one another through the exchanger.

SUMMARY

A heat exchange system includes a cold fluid circuit and a hot fluid circuit. The cold fluid circuit is configured to route a cold fluid sequentially though a ram air inlet, a cold fluid inlet of a heat exchanger, and a cold fluid outlet of the heat exchanger. The hot fluid circuit is configured to route a hot fluid sequentially through a bleed air valve, a hot fluid inlet of the heat exchanger, a hot fluid outlet of the heat exchanger, and a header having a first cavity and a second cavity defined within a housing and separated by a baffle.

DETAILED DESCRIPTION

The header described in the following figures is split into two cavities by a baffle. The baffle is arranged at the hot fluid outlet of a heat exchanger such that a temperature differential exists between the two cavities. An On-Board Inert Gas Generation System (OBIGGS) is connected to the cooler of the two cavities, and a primary outlet is connected to the warmer cavity. A slot in the baffle allows fluid flow from the cooler cavity in the event that the OBIGGS system is shut off, or when the heat exchanger is passing more air to the cooler cavity than is required by the OBIGGS.

Figure 1:
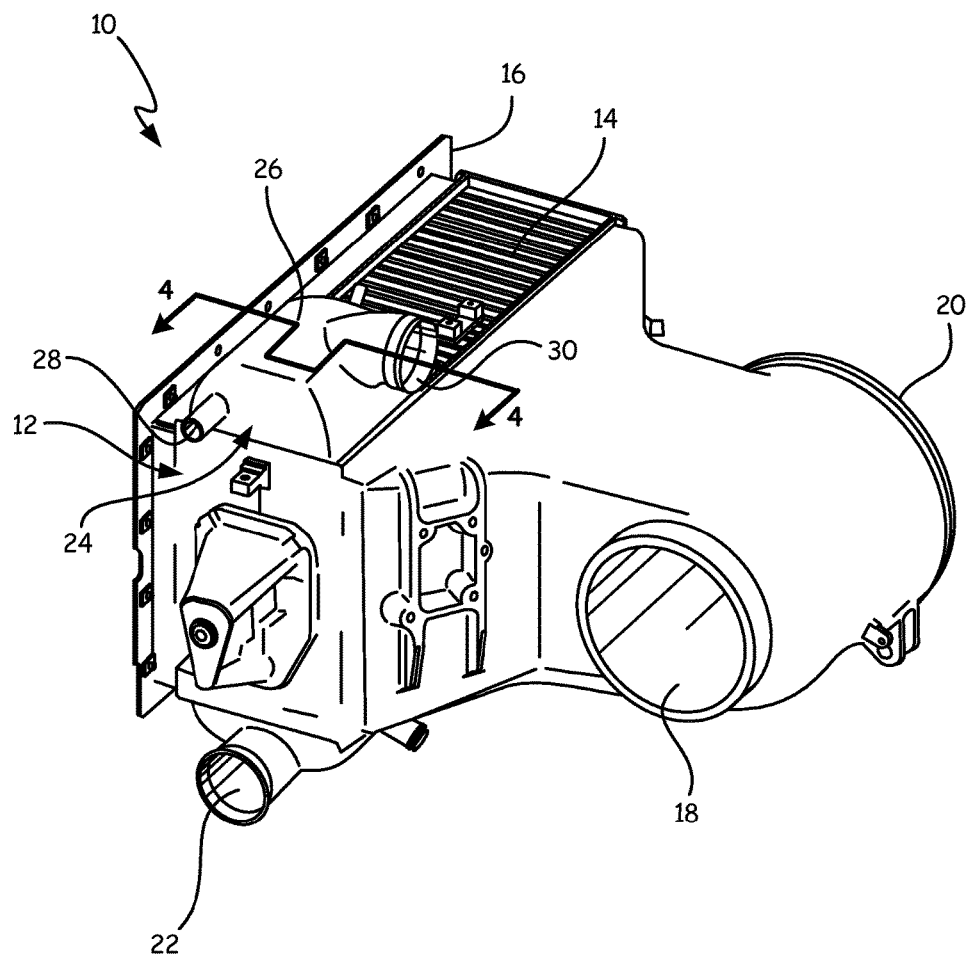
FIG. 1 is a perspective view of a dual heat exchanger with a header.

FIG. 1 is a perspective view of dual heat exchange component 10. Dual heat exchange component 10 includes primary heat exchanger 12, secondary heat exchanger 14, ram inlet flange 16, ram exhaust outlet 18, and air cycle machine fan outlet 20. Primary heat exchanger 12 includes primary bleed inlet 22 and header 24. Header 24 includes housing 26, OBIGGS outlet 28, and primary heat exchanger outlet 30.

Dual heat exchange component 10 is a part of an air handling system used in conjunction with a gas turbine engine (not shown). Primary heat exchanger 12 and secondary heat exchanger 14 are used to transfer heat from working fluids in the gas turbine engine to relatively cooler ram air. Ram inlet flange 16 is used to attach primary heat exchanger 12 and secondary heat exchanger 14 to an inlet particle separator (not shown), which receives ram air from outside the gas turbine engine, for example at a ram air scoop. The ram air received in this way is used as the cooling air flow in primary heat exchanger 12 and secondary heat exchanger 14.

Ram exhaust outlet 18 and air cycle machine fan outlet 20 are parts of heat exchange systems related to primary heat exchanger 12 and secondary heat exchanger 14. The availability of ram air is typically related to the air velocity of an aircraft, for example by way of a ram air scoop. Ram exhaust outlet 18 is coupled with a ram air fan (not shown), and is used to provide fluid flow across primary heat exchanger 12 and secondary heat exchanger 14. A ram air fan may be used to draw air through primary heat exchanger 12 when ram air is not available, for example when the aircraft is on the ground.

Air cycle machine fan outlet 20 is coupled with the fan section of an air cycle machine (not shown). An air cycle machine may be used to condition air for use in the environmental control system of an aircraft associated with the gas turbine engine. Air passing through air cycle machine fan outlet 20 may be cooled in secondary heat exchanger 14 before being routed to the cabin of the aircraft.

Primary bleed inlet 22 is positioned to route bleed air from the bleed valve of the associated gas turbine engine to primary heat exchanger 12. Bleed air of an operating gas turbine engine is much hotter than ram air due to compression and shear heating upstream of the bleed valve. For example, bleed air may be between 250° C. or higher, whereas ram air is substantially the same temperature as ambient conditions, often between 55 and 50° C. Primary heat exchanger 12 is used to transfer heat from air supplied via primary bleed inlet 22 to ram air.

Bleed air that has been cooled is routed out of primary heat exchanger 12 to header 24. Header 24 is positioned at hot fluid outlet 48 (FIG. 2) and receives the cooled bleed air. Housing 26 is attached to primary heat exchanger 12, and OBIGGS outlet 28 is defined in housing 26 to provide cooled bleed air to the OBIGGS. Primary heat exchange outlet 30 is also defined in housing 26, and provides cooled bleed air to other components of the gas turbine engine.

Because OBIGGS outlet 28 and primary heat exchange outlet 30 route cooled bleed air to different destinations, the desired temperature of cooled bleed air routed to OBIGGS outlet 28 may be different from the desired temperature of cooled bleed air routed to primary heat exchange outlet 30. In the embodiment shown in FIG. 1, OBIGGS outlet 28 is configured to deliver fluid at 99° C. or lower to an attached OBIGGS system (not shown).

Figure 2:
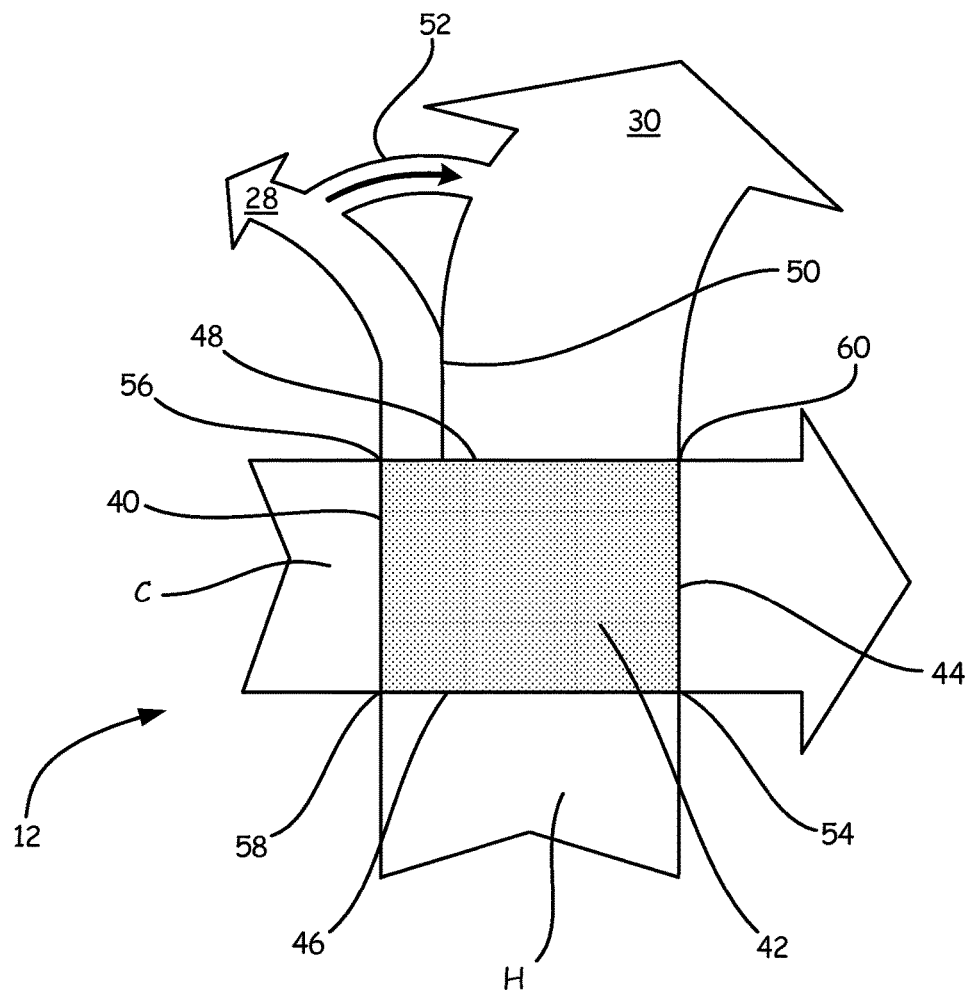
FIG. 2 is a schematic view of a cross-flow heat exchanger having a baffle.

FIG. 2 is a schematic view of the fluid flowpaths of cold air flow C and hot air flow H through primary heat exchanger 12 of FIG. 1. FIG. 2 illustrates the flowpaths of these two separate fluid circuits through many of the components previously listed with reference to FIG. 1.

As shown in FIG. 2, cold fluid (such as ram air) is routed sequentially through cold fluid inlet 40, heat exchange region 42, and cold fluid outlet 44. Hot fluid (such as fluid from a bleed valve of a gas turbine engine) is routed sequentially through hot fluid inlet 46, heat exchange region 42, and hot fluid outlet 48. Baffle 50 diverts cooled hot fluid within header 24 to OBIGGS outlet 28 or primary heat exchanger outlet 30. Alternate flowpath 52 allows some fluid flow from OBIGGS outlet 28 to primary heat exchange outlet 30, as indicated by the arrow.

Heat exchanger region 42 facilitates heat transfer from the hot fluid to the cold fluid without intermixing the two fluids. Heat exchange region 42 is a cross-flow arrangement, in which hot fluid and cold fluid are routed between adjacent, parallel plates (not shown). As hot fluid crosses heat exchange region 42 from hot fluid inlet 46 to hot fluid outlet 48 it is cooled by conductive heat transfer through the plates. Likewise, as cold fluid crosses heat exchange region 42 from cold fluid inlet 40 to cold fluid outlet 44 it is warmed. Thus, the hottest corner of heat exchange region 42 is found at the corner adjacent to hot fluid inlet 46 and cold fluid outlet 44. This corner is known as hot-hot corner 54. Likewise, the coldest corner of heat exchanger region 42 is found at the corner adjacent to hot fluid outlet 48 and cold fluid inlet 40. This corner is known as cold-cold corner 56. The corner adjacent to hot fluid inlet 46 and cold fluid inlet 40 is hot-cold corner 58, and the corner adjacent to hot fluid outlet 48 and cold fluid outlet 44 is cold-hot corner 60.

Baffle 50 separates cooled hot fluid flow H at hot fluid outlet 48 such that the portion of hot fluid flow H closest to cold-cold corner 56 is routed to OBIGGS outlet 28, and the remainder of cooled hot fluid flow H at hot fluid outlet 48 is routed to primary heat exchanger outlet 30. Because of the cross-fluid flow and temperature gradient from cold-cold corner 56 to cold-hot corner 60, hot fluid flow H routed to OBIGGS outlet 28 by baffle 50 is relatively colder than cooled hot fluid flow H routed to primary heat exchanger outlet 30.

Alternate flowpath 52 is positioned to allow fluid communication from OBIGGS outlet 28 to primary heat exchanger outlet 30. This may be desirable in situations where the OBIGGS does not require as much fluid as is provided to OBIGGS outlet 28, such as when the OBIGGS is shut off. As indicated by the arrow, fluid flow through alternate flowpath 52 is unidirectional.

Figure 3:
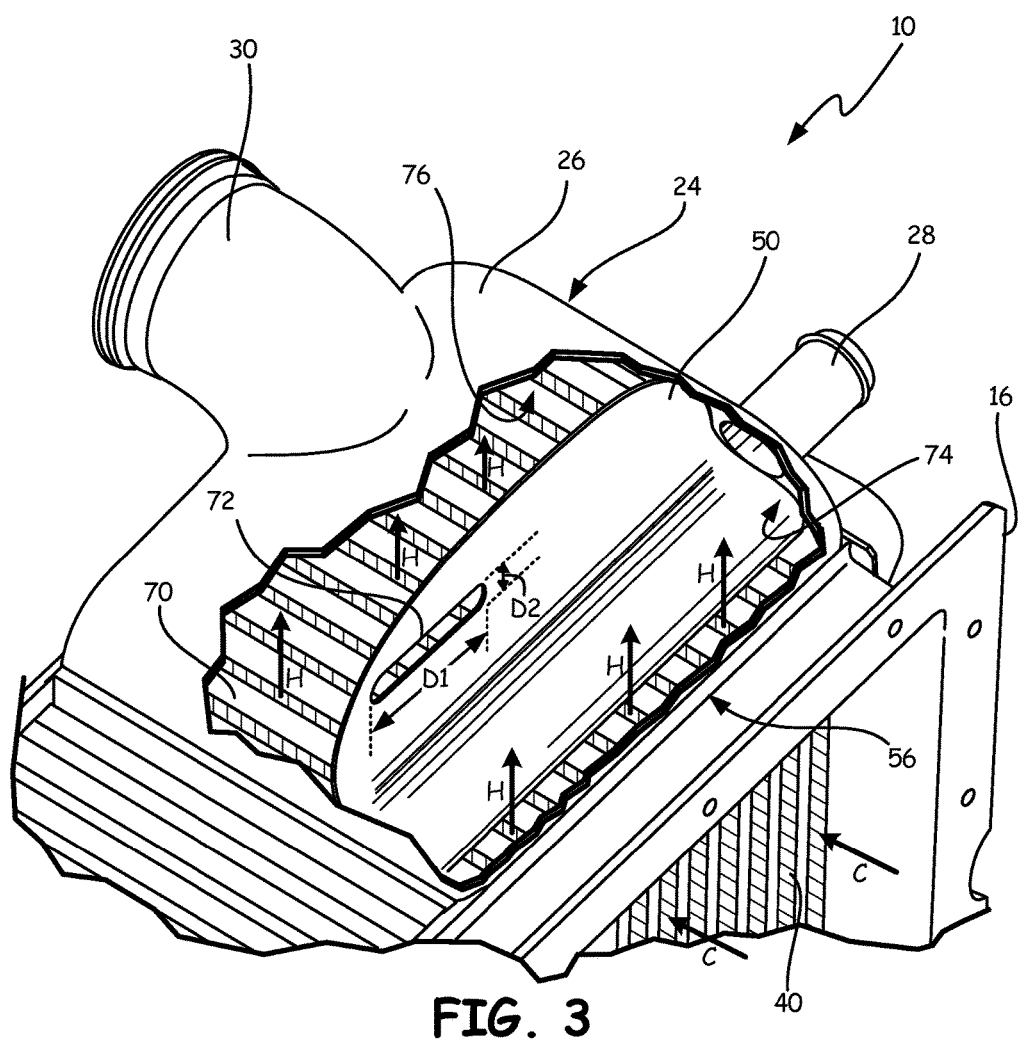
FIG. 3 is a perspective view of the header of FIG. 1, with a portion broken away to show a baffle.

FIG. 3 shows dual heat exchanger 10, including primary heat exchanger 12, ram inlet flange 16, and header 24. As seen in FIG. 3, cold air flow C entering cold fluid inlet 40 is visible, as is hot fluid flow H exiting hot fluid outlet 48 of primary heat exchanger 12. The corner at which cold fluid inlet 40 and hot fluid outlet 48 intersect is cold-cold corner 56, as described previously with respect to FIG. 2. FIG. 3 also shows header 24, including housing 26, OBIGGS outlet 28, and primary heat exchange outlet 30. As shown in FIG. 3, housing 26 is partially cut away to show baffle 50 and closure bars 70 of the cold fluid circuit, which block cold fluid flow C from entering first cavity 74 and second cavity 76. Baffle 50 defines an aperture, slot 72.

Baffle 50 is shaped to split hot fluid flow H exiting hot fluid outlet 48. The portion of hot fluid flow H exiting hot fluid outlet 48 closest to cold-cold corner 56 is diverted to first cavity 74. The remainder of hot fluid flow H exiting hot fluid outlet 48 is routed to second cavity 76. Slot 72 allows fluid flow from first cavity 74 to second cavity 76. OBIGGS outlet 28 is positioned to receive fluid from first cavity 74, whereas primary heat exchange outlet 30 is positioned to receive fluid from second cavity 76.

Baffle 50 includes slot 72, which is an aperture positioned within baffle 50 to allow fluid flow from first cavity 74 to second cavity 76. Slot 72 is configured to be small enough to maintain a level of thermal separation between first cavity 74 and second cavity 76. If slot 72 is too large, heat may be convectively transferred from second cavity 76 to first cavity 74, warming the fluid within first cavity 74 and exceeding a desired temperature therein. Conversely, slot 72 is configured to be large enough to permit flow from first cavity 74 to second cavity 76 when fluid ingress to first cavity 74 from hot fluid flow H exceeds fluid egress to OBIGGS outlet 28. Slot 72 is defined by slot width D1 and slot height D2. In the embodiment shown in FIG. 3, slot 72 is a rectangular aperture with rounded corners. In particular, in the embodiment shown in FIG. 3, slot width D1 is between 6.9 and 7.0 cm, and slot height D2 is between 1.2 and 1.3 cm.

In alternative embodiments, slot 72 may be irregularly shaped or positioned elsewhere on baffle 50. Alternate geometries, sizes, and positions are possible that permit sufficient flow from first cavity 74 to second cavity 76 while maintaining a desired level of thermal separation therebetween.

Because first cavity 74 is positioned to receive hot fluid flow H from the portion of heat exchanger 12 closest to cold-cold corner 56, the portion of hot fluid flow H routed to first cavity 74 by baffle 50 is cooler than the portion of hot fluid flow H routed to second cavity 76 by baffle 50. Additionally, because OBIGGS outlet 28 is positioned to receive fluid from first cavity 74 and primary heat exchange outlet 30 is positioned to receive fluid from second cavity 76, the fluid transferred to OBIGGS outlet 28 is cooler than the fluid transferred to primary heat exchange outlet 30.

Baffle 50 may route more of cooled hot fluid flow H to first cavity 74 than is routed through OBIGGS outlet 28. Thus, some air may be routed through slot 72 from first cavity 74 to second cavity 76.

Figure 4:
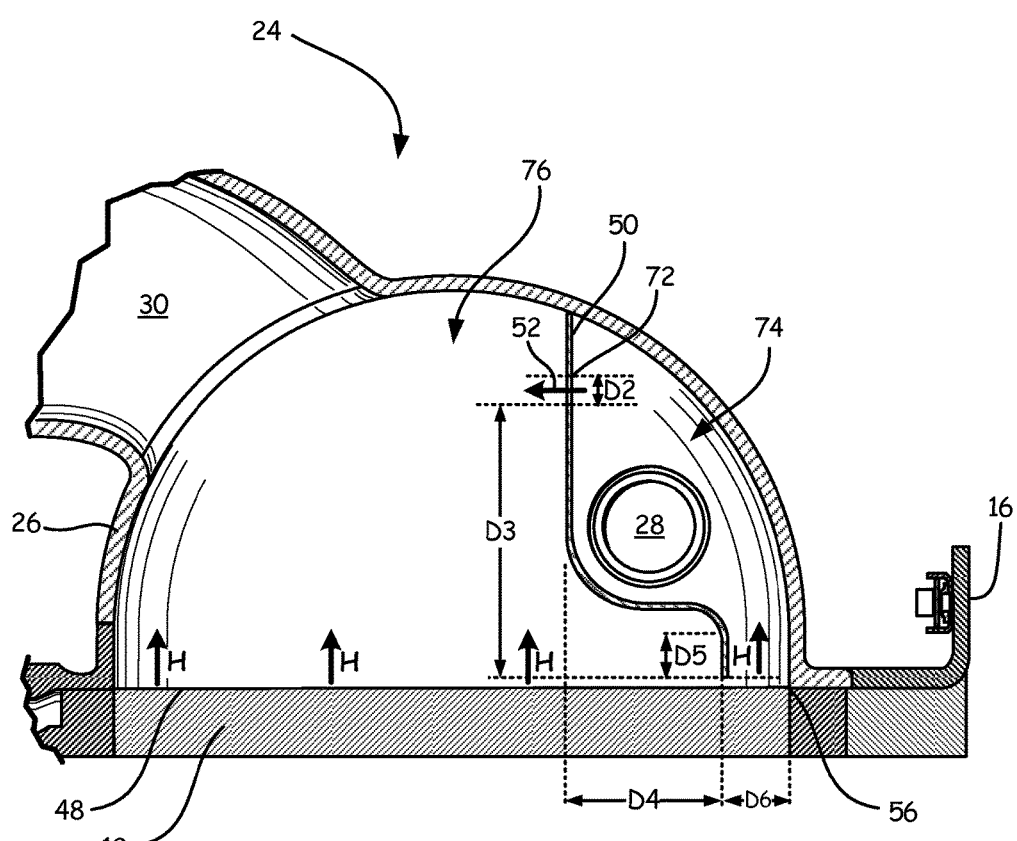
FIG. 4 is a cross-sectional view of the header of FIG. 1 along line 4-4.

FIG. 4 is a cross-sectional view of header 24 along line 4-4 of FIG. 1. Hot fluid flow H is shown entering first cavity 74 and second cavity 76 between heat exchanger 12 and housing 26. Baffle 50 separates first cavity 74 from second cavity 76. The hot fluid flow H closest to cold-cold corner 56 is routed to first cavity 74 by baffle 50. FIG. 4 further illustrates various dimensions of baffle 50, including slot height D2, slot clearance D3, offset length D4, offset height D5, and aperture width D6.

First cavity 74 feeds OBIGGS outlet 28, second cavity 76 feeds primary heat exchange outlet 30, and slot 72 allows for fluid flow along alternate flowpath 52 through baffle 50. Slot 72 defines slot height D2, as previously described with respect to FIG. 3. Slot clearance D3 is the distance between the lowest edge of baffle 50 defined by dimension D5 and the lower boundary of slot 72. The lowest edge of baffle 50 is typically spaced from hot fluid outlet 48 by a small offset. In the embodiment shown in FIG. 4, this offset is less than 0.64 cm. Slot clearance D3 is configured to position slot 72 to maintain a desired air flow pattern during operation. By positioning slot 72 further from cold-cold corner 56 than OBIGGS outlet 28, the temperature of hot air flow H that is routed to OBIGGS outlet 28 in normal operating conditions is reduced. In the embodiment shown in FIG. 4, slot clearance D3 is between 5.2 and 5.3 cm.

Offset length D4 is the length of a jog in baffle 50. Offset length D4 is configured to define the relative sizes of first cavity 74 and second cavity 76. Offset length D4 positions baffle 50 in proximity to cold-cold corner 56 while also positioning OBIGGS outlet 28 to be fed by first cavity 74. In the embodiment shown in FIG. 4, offset length D4 is between 4.0 and 4.2 cm.

Offset height D5 is the distance along baffle 50 from its closest point to hot fluid outlet 48 to the beginning of the jog defined by offset length D4. Offset height D5 is also configured to define the relative sizes of first cavity 74 and second cavity 76. Offset height D5 positions baffle 50 such that OBIGGS outlet 28 is fed by first cavity 74. In the embodiment shown in FIG. 4, offset height D5 is between 0.8 and 0.9 cm.

Baffle 50 is separated from cold-cold corner 56 by an aperture width D6. Aperture width D6 defines the quantity of hot fluid flow H that is routed to first cavity 74. If aperture width D6 were to be enlarged, the portion of hot fluid flow H routed to first cavity 74 would become warmer. If aperture width D6 is sufficiently enlarged, the temperature of the portion of hot fluid flow H routed to first cavity 74 may exceed a desired threshold for fluid routed to OBIGGS outlet 28, which is fed by first cavity 74.

Conversely, if aperture width D6 were to be narrowed, the portion of hot fluid flow H routed to first cavity 74 would become cooler. However, with sufficiently narrow aperture width D6, fluid ingress to first cavity 74 may become too low to supply OBIGGS outlet 28. In that case, fluid flow direction across slot 72 (FIG. 3) may become reversed, and fluid would travel from second cavity 76 to first cavity 74, in the opposite direction of alternate flowpath 52. Because the portion of hot fluid flow H directed to second cavity 76 has been routed through a portion of hot fluid outlet 48 that is distant from cold-cold corner 56, the result of narrowing aperture width D6 may also be increasing the temperature of fluid positioned in first cavity 74 above a predetermined threshold for fluid routed to OBIGGS outlet 28. In the embodiment shown in FIG. 4, aperture width D6 is between 1.5 and 1.6 cm.

The characteristics of fluid flow between first cavity 74 and second cavity 76 via alternate flowpath 52 are set by the relative sizes of slot width D1 (FIG. 3) and slot height D2. The relative size and positions of first cavity 74 and second cavity 76 are defined by slot clearance D3, offset length D4, offset height D5, and aperture width D6.

Discussion of Possible Embodiments

The following are non-exclusive descriptions of possible embodiments of the present invention.

A heat exchanger includes a hot fluid inlet, a hot fluid outlet, a cold fluid inlet, and a cold fluid outlet. The heat exchanger also has a header connected to the hot fluid outlet. The header includes a housing and a baffle separating a first cavity from a second cavity within the housing. An On-Board Inert Gas Generation System (OBIGGS) outlet is defined by the housing adjacent to the first cavity. A primary outlet is defined by the housing adjacent to the second cavity.

The heat exchanger of the preceding paragraph can optionally include, additionally and/or alternatively, any one or more of the following features, configurations and/or additional components:

The baffle may define a slot such that the first fluid positioned in the first cavity is in fluid communication with a second fluid positioned in the second cavity via an alternate flowpath. The heat exchanger may be a cross-flow heat exchanger. The first cavity may be arranged adjacent to a cold-cold corner. An aperture width between the baffle and the cold-corner may be between 1.5 and 1.6 cm. The OBIGGS outlet may be positioned to receive a fluid from the first cavity that has a temperature of less than 99° C. The heat exchanger may be a primary heat exchanger of a dual heat exchange system.

In another embodiment, a heat exchange system includes a cold fluid circuit for routing a cold fluid sequentially through a ram air inlet, a cold fluid inlet of a heat exchanger, and a cold fluid outlet of the heat exchanger. A hot fluid circuit for routing a hot fluid includes a bleed air valve, a hot fluid inlet of the heat exchanger, a hot fluid outlet of the heat exchanger, and a header. The header includes a first cavity and a second cavity defined within a housing and separated by a baffle.

The heat exchange system of the preceding paragraph can optionally include, additionally and/or alternatively, any one or more of the following features, configurations and/or additional components:

The heat exchanger may be configured to transfer heat from the hot fluid to the cold fluid. The heat exchanger may be a cross-flow heat exchanger. The first cavity may be configured to receive the hot fluid routed between the baffle and the cold-cold corner. The aperture width between the baffle and the cold-cold corner may be between 1.5 and 1.6 cm. The baffle may include a slot. The heat exchange system may also include an alternate flowpath from the first cavity to the second cavity via the slot.

In another embodiment, a method includes routing a hot fluid from a bleed valve to a hot fluid inlet of a heat exchanger. Hot fluid is routed from the heat exchanger to a hot fluid outlet to cool the hot fluid. The hot fluid is separated at the hot fluid outlet into a first cavity and a second cavity. The hot fluid is routed from the first cavity to an OBIGGS system, and from the second cavity to a compressor.

The method of the preceding paragraph can optionally include, additionally and/or alternatively, any one or more of the following steps, features, configurations and/or additional components:

The heat exchanger may be a cross-flow heat exchanger. The first cavity and the second cavity may be separated by a baffle. The baffle may be arranged between 1.5 cm and 1.6 cm from the cold-cold corner. The method may also include diverting the hot fluid from the hot fluid outlet within an aperture width of the cold-cold corner to the first cavity, and diverting the hot fluid from the hot fluid outlet that is not within an aperture width of the cold-cold corner of the second cavity. The method may also include comprising routing the hot fluid from the first cavity to the second cavity via an alternate flowpath.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a hot fluid inlet;
   a hot fluid outlet;
   a cold fluid inlet;
   a cold fluid outlet; and a header connected to the hot fluid outlet, the header comprising:
  a housing;
  a baffle separating a first cavity from a second cavity within the housing, wherein the baffle is configured to split a fluid flow at the hot fluid outlet, the fluid flow being split between the first cavity and the second cavity;
  an On-Board Inert Gas Generation System (OBIGGS) outlet adjacent to and in fluid communication with the first cavity, the OBIGGS outlet providing an exit for the fluid flow from the heat exchanger; and
  a primary outlet adjacent to and in fluid communication with the second cavity, the primary outlet providing an exit for the fluid flow from the heat exchanger.

2. The heat exchanger of claim 1, wherein the baffle defines a slot such that a first fluid positioned in the first cavity is in fluid communication with a second fluid positioned in the second cavity via an alternate flowpath.

3. The heat exchanger of claim 1, wherein the heat exchanger is a cross-flow heat exchanger.

4. The heat exchanger of claim 3, wherein the first cavity is arranged adjacent to a cold-cold corner.

5. The heat exchanger of claim 4, wherein an aperture width between the baffle and the cold-cold corner is between 1.5 cm and 1.6 cm.

6. The heat exchanger of claim 1, wherein the OBIGGS outlet is positioned to receive a fluid from the first cavity that has a temperature of less than 99° C.

7. The heat exchanger of claim 1, wherein the heat exchanger is a primary heat exchanger of a dual heat exchange system.

8. A heat exchange system comprising:
  a cold fluid circuit for routing a cold fluid sequentially through:
    a ram air inlet;
    a cold fluid inlet of a heat exchanger; and
    a cold fluid outlet of the heat exchanger; and
  a hot fluid circuit for routing a hot fluid sequentially through:
    a bleed air valve;
    a hot fluid inlet of the heat exchanger;
    a hot fluid outlet of the heat exchanger; and
    a header connected to the hot fluid outlet comprising:
      a housing;
      a baffle separating a first cavity from a second cavity within the housing, wherein the baffle is configured to split a fluid flow at the hot fluid outlet, the fluid flow being split between the first cavity and the second cavity;
      an On-Board Inert Gas Generation System (OBIGGS) outlet adjacent to and in fluid communication with the first cavity, the OBIGGS outlet providing an exit for the fluid flow from the heat exchanger; and
      a primary outlet adjacent to and in fluid communication with the second cavity, the primary outlet providing an exit for the fluid flow from the heat exchanger.

9. The heat exchange system of claim 8, wherein the heat exchanger is configured to transfer heat from the hot fluid to the cold fluid.

10. The heat exchange system of claim 8, wherein the heat exchanger is a cross-flow heat exchanger.

11. The heat exchange system of claim 10, wherein the first cavity is configured to receive the hot fluid routed between the baffle and the cold-cold corner.

12. The heat exchange system of claim 11, wherein an aperture width between the baffle and the cold-cold corner is between 1.5 cm and 1.6 cm.

13. The heat exchange system of claim 8, wherein the baffle includes a slot.

14. The heat exchange system of claim 13, and further comprising an alternate flowpath from the first cavity to the second cavity via the slot.

15. A method comprising:
  routing a hot fluid from a bleed valve to a hot fluid inlet of a heat exchanger;
  routing the hot fluid through the heat exchanger to a hot fluid outlet of the heat exchanger to cool the hot fluid;
  separating the hot fluid at the hot fluid outlet into a first cavity and a second cavity, wherein the hot fluid is separated into the first cavity and the second cavity in a header of the heat exchanger, the header being connected to the hot fluid outlet and comprising:
    a housing;
    a baffle separating the first cavity from the second cavity within the housing, wherein the baffle is configured to split a hot fluid flow at the hot fluid outlet, the hot fluid flow being split between the first cavity and the second cavity;
    an On-Board Inert Gas Generation System (OBIGGS) outlet adjacent to and in fluid communication with the first cavity, the OBIGGS outlet providing an exit for the hot fluid flow from the heat exchanger; and
    a primary outlet adjacent to and in fluid communication with the second cavity, the primary outlet providing an exit for the hot fluid flow from the heat exchanger;
  routing the hot fluid from the first cavity to an OBIGG system, wherein the hot fluid from the first cavity is routed through the OBIGGS outlet; and
  routing the hot fluid from the second cavity to a compressor, wherein the hot fluid from the second cavity is routed through the primary outlet.

16. The method of claim 15, wherein the heat exchanger is a cross-flow heat exchanger.

17. The method of claim 16, wherein the first cavity and the second cavity are separated by a baffle.

18. The method of claim 16, wherein the baffle is arranged between 1.5 cm and 1.6 cm from a cold-cold corner.

19. The method of claim 18, and further comprising:
  diverting the hot fluid from the hot fluid outlet within an aperture width of the cold-cold corner to the first cavity; and
  diverting the hot fluid from the hot fluid outlet that is not within an aperture width of the cold-cold corner to the second cavity.

20. The method of claim 15, and further comprising routing the hot fluid from the first cavity to the second cavity via an alternate flowpath.

* * * * *